Feb. 2, 1937.    B. E. GETCHELL    2,069,714
PASTEURIZING APPARATUS
Filed June 22, 1935
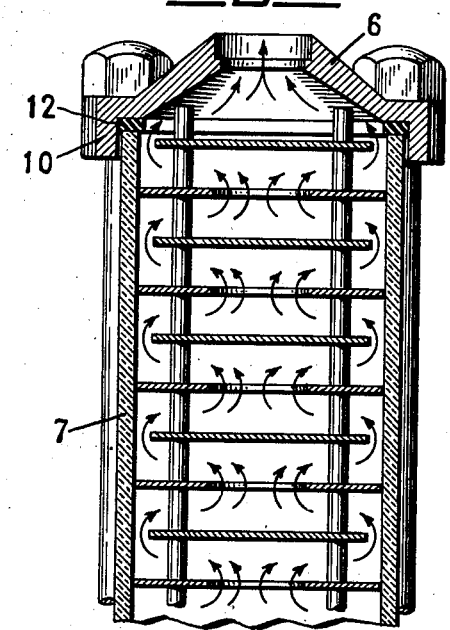
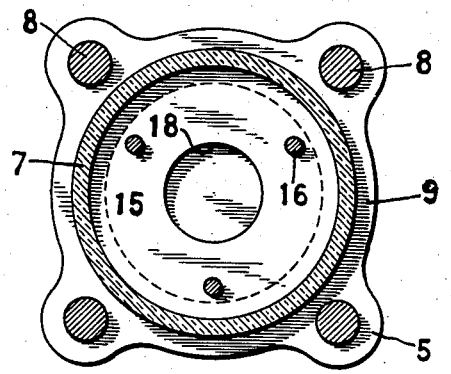
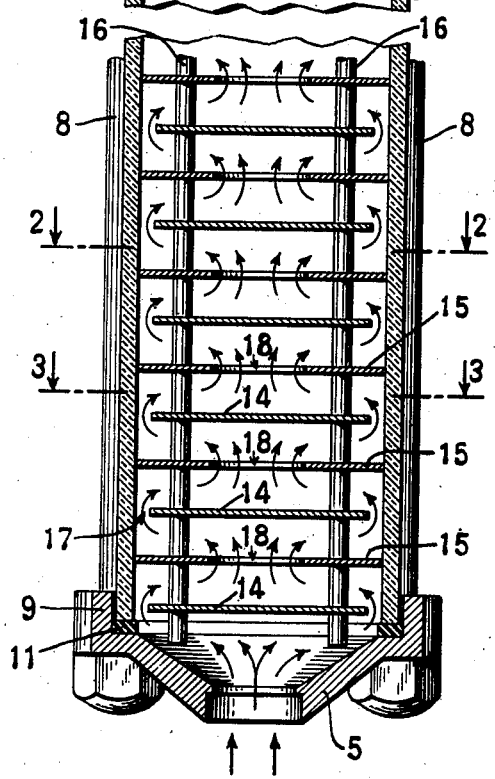
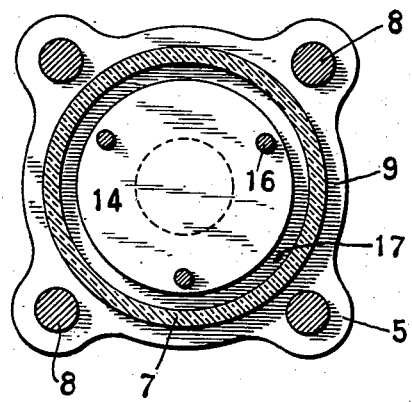
INVENTOR
BENJAMIN E. GETCHELL,
BY
ATTORNEY Patented Feb. 2, 1937

2,069,714

UNITED STATES PATENT OFFICE 2,069,714

PASTEURIZING APPARATUS

Benjamin Everett Getchell, Plainville, Conn., assignor to The Trumbull Electric Manufacturing Company, Plainville, Conn., a corporation of Connecticut Application June 22, 1935, Serial No. 27,861

6 Claims. (Cl. 138—42)

This invention relates to holding chambers as used on pasteurizing apparatus for milk or other liquid where the liquid passes through the apparatus in a steady stream. The purpose of a holding chamber is to hold the liquid for a definite period at pasteurizing temperature before allowing it to be cooled down.

This is a comparatively simple problem when the liquid is pasteurized in batches as it is by the commonly used holding method; but with a constant flow it becomes more difficult.

It is important, in fact imperative, that every particle of liquid be subjected to the correct degree of heat and maintained at that heat for a definite length of time.

It is also important that no gas bubbles be permitted to pass through the chamber any faster than the normal speed of liquid flow, as these bubbles may carry bacteria.

It is also important that this holding time should not be greatly exceeded; therefore, there should be no eddies or stagnant sections where a portion of the liquid would lag behind the main body of flow.

One object of my invention is to provide a chamber through which it will take liquid a definite length of time to pass at a given rate of flow.

Another object is to provide a chamber through which it is impossible for one part of the liquid to pass any faster than any other part.

Another object is to provide a chamber which will produce a constant even flow through its entire area.

Another object is to provide a chamber in which it is impossible for any part of the liquid to lag behind the main body of flow.

The form of apparatus shown is particularly adapted to milk, but is just as effective with any other liquid. To simplify the description, I will refer to the liquid as milk.

Fig. 1 is a vertical sectional view of apparatus embodying improvements of my invention and showing the direction of normal flow of liquid.

Fig. 2 is a cross sectional view and plan on the plane of the line 2—2 of Fig. 1.

Fig. 3 is a cross sectional view and plan on the plane of the line 3—3 of Fig. 1.

The receptacle per se consists of the bottom plate or head 5, the upper plate or head 6 and the conduit wall 7. These parts are detachably secured together by means of bolts or tie rods 8.

The main wall may be of any suitable material but is preferably transparent or translucent so that the flow of liquid may be observed. In the form shown the wall is cylindrical in shape and has its ends positioned within flanges 9 and 10. As it is necessary to provide liquid pipe joints I employ resilient gaskets 11 and 12 formed of suitable material and positioned within the flanges 9 and 10.

The baffle structure within the container is made up of a series of discs which may be of sheet metal so constructed and arranged as to require a circuitous movement of the liquid.

In the form shown the discs 14 are of smaller diameter and imperforate while the discs 15 are of larger diameter and perforated. These discs are held spaced apart by vertically extending rods 16 to which the discs may be attached permanently or removably as may be desired.

The discs 14 being smaller in diameter than the entire wall of the casing, passages 17 are left around the periphery. The discs 15 substantially fit within the casing but are provided with perforations 18 for the passage of the liquid. The discs may be spaced apart at suitable distances and in the preferred form the holes 18 are of a diameter equal to twice the spaces between the discs. The entire baffle structure is preferably assembled as a unit and adapted to be inserted and supported in the casing in such a manner as to permit the parts to be readily separated for the purpose of cleaning.

While the discs 14 are preferably imperforate I consider the invention to broadly cover such a construction as herein shown and described even if the discs 14 are provided with small perforations. Similarly the shape, size and number of the perforations in the discs 18 may be varied without departing from the broad scope of my invention.

The drawing illustrates a preferred embodiment of this invention substantially to scale. The fit of the perforate plates or discs 15 against the inner walls of the cylinder or chamber need only be a convenient fit and not a tight fit. In this way any particles of liquid which might pass around some minute opening at the periphery of the perforate plate will be relatively small and such small quantity of liquid will get mixed with the rest of the liquid and in all probability travel through the intended path throughout the rest of the chamber.

A loose fit between the periphery discs 15 and the inner walls of the cylinder permits easy removal of the discs for cleaning the cylinder walls and the discs as may be necessary for example where milk is being pasteurized. The walls of the cylinder or chamber are preferably of glass or other vitreous material and may be transparent.

The milk enters the chamber through the lower end and is prevented from shooting straight up through the center of the chamber by encountering the lower solid disc which diverts the stream and forces it to pass around between the edge of the disc and the side of the tube. As the next disc above comes out to the side of the tube, further flow upward along the side of the tube is prevented and the milk is forced to flow horizontally back to the center of the tube and pass up through the hole in the center of the disc.

The next disc being solid, the milk is again forced to the side and the cycle is repeated for each set of discs until the milk finally reaches the top and passes out through the upper flange.

This course of flow prevents milk in one part of the chamber from lagging behind or flowing faster than the main body. It also prevents gas bubbles from travelling upward any faster than the milk flow.

This series of plates can either be made up as a single unit or can be used separately with spacers. I prefer the unit construction.

A perfect fit between the edge of the large disc and side of the tube is unnecessary. A small amount of liquid may pass at this point without materially affecting the efficiency of the apparatus as it is not at all likely that the same particle of milk that succeeded in passing the edge of one large disc could again pass the edge of the next large disc after mixing with the main volume at the edge of the small disc half way between.

I claim:

1. A liquid mixing and holding chamber for a liquid pasteurizing apparatus, said chamber including a tubular body containing a plurality of spaced plates so arranged as to cause the liquid to travel radially inwardly on one surface of each plate and radially outward over the opposite surface of the same plate adjacent substantially its entire peripheral portion, said plurality of plates being removable as a unit to enable the inside of the chamber to be cleaned.

2. A liquid mixing and holding chamber for a liquid pasteurizing apparatus, said chamber including a tubular body containing a plurality of spaced plates so arranged as to cause the liquid to travel radially inwardly on one surface of each plate and radially outward over the opposite surface of the same plate adjacent substantially its entire peripheral portion, said plurality of plates being removable as a unit to enable the inside of the chamber to be cleaned, heads for said chamber to each of which is attached a liquid flow pipe and longitudinal spacing means for the plates contacting with at least one head.

3. In a continuous liquid pasteurizing apparatus, a mixing and holding chamber for maintaining the liquid at an elevated temperature for a predetermined period, said chamber including the substantially cylindrical body, a plurality of baffle plates substantially equally longitudinally spaced, a longitudinal supporting and spacing rod for said plates, heads secured to the chamber and dished away from the chamber, said longitudinal supporting and spacing rod having at least one end contacting with at least one head within the dished portion thereof, and clamping rods outside the chamber for pressing said heads against the ends of the cylindrical body portion, and a liquid pipe connected to the central portion of each head.

4. In a liquid pasteurizing apparatus, a mixing chamber for holding the temperature of a heated liquid at predetermined temperature for a substantial period of time while the liquid moves through said chamber without any dead spaces, said chamber including a vitreous cylinder, metal heads for the cylinder, a device for clamping said heads to the ends of the cylinder to the gasket between the cylinder and each head, a plurality of plates within the cylinder, alternate ones of which are perforate and the other substantially imperforate, a longitudinal supporting and spacing rod for said plates, said rod cooperating with at least one head, the imperforate plates being radially spaced from the inner surface of said cylinder and the perforate plates being substantially contiguous the inner surface of the cylinder with a loose enough fit to permit all the plates and their supporting rod to be withdrawn as a unit for cleaning said cylinder after removal of a head.

5. In a continuous liquid pasteurizing apparatus, a mixing and holding chamber for maintaining the heated liquid at an elevated temperature for a predetermined period, said chamber including a glass cylinder having therein a plurality of discs arranged in spaced relation, and readily removable alternate discs each being substantially imperforate and of a diameter somewhat less than the internal diameter of the cylinder, the other discs each having a single centrally located aperture and being of a diameter substantially coincident with the internal diameter of the cylinder, thus causing the liquid to travel radially outwardly and inwardly around the edges of said first described discs and through the apertures of said second described discs.

6. A milk pasteurizing holding chamber consisting of an outer cylindrical casing member with detachable end plates, the lower end plate having an inlet for the hot milk and the upper plate having an outlet for the milk and baffling means supported by at least one end plate and the casing member and having a series of plates spaced apart vertically within the casing and removable as a unit from the casing when one end plate is removed, the rim of each alternate plate contacting with the inner wall of the casing and having a central passage for the milk and the other plates being imperforate and having their edges spaced apart from the inner wall of the casing to provide annular passages for the milk.

BENJAMIN EVERETT GETCHELL.